(12) United States Patent
Burd

(10) Patent No.: US 10,137,987 B2
(45) Date of Patent: Nov. 27, 2018

(54) MOBILE GALLEY CART WITH HEATING, COOLING AND BRAKING FUNCTIONALITY

(71) Applicant: B/E Aerospace, Inc., Wellington, FL (US)

(72) Inventor: Peter Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 132 days.

(21) Appl. No.: 14/474,725

(22) Filed: Sep. 2, 2014

(65) Prior Publication Data

US 2015/0059363 A1 Mar. 5, 2015

Related U.S. Application Data

(60) Provisional application No. 61/872,216, filed on Aug. 30, 2013.

(51) Int. Cl.
*F25D 11/02* (2006.01)
*F25B 21/02* (2006.01)
(Continued)

(52) U.S. Cl.
CPC ......... *B64D 11/0007* (2013.01); *A47J 39/006* (2013.01); *B62B 3/004* (2013.01);
(Continued)

(58) Field of Classification Search
CPC ....... B62B 3/00; B62B 5/0447; B62B 5/0495; B62B 5/0438; B62B 5/0435;
(Continued)

(56) References Cited

U.S. PATENT DOCUMENTS 3,701,396 A * 10/1972 House ..................... B62B 5/049
                                                                                           188/21
3,710,895 A * 1/1973 Freedman ................. B60T 1/14
                                                                                           188/2 R (Continued)

FOREIGN PATENT DOCUMENTS

CN           2303527 Y     1/1999
CN           2830190 Y    10/2006
(Continued)

OTHER PUBLICATIONS

International Search Report and Written Opinion of corresponding International Application No. PCT/US2014/053692; mailed Mar. 11, 2015; 14 pages.

(Continued)

*Primary Examiner* — Frantz Jules
*Assistant Examiner* — Erik Mendoza-Wilkenfe
(74) *Attorney, Agent, or Firm* — Donna P. Suchy

(57) ABSTRACT

A mobile galley cart including a wheeled insulated housing having a door configured to open to access to the interior of the housing, a thermoelectric chiller mounted near the bottom of the cart, cold air ducting in fluid communication with the thermoelectric chiller and opening to the interior of the housing, and warm air ducting including a warm air exhaust arranged to exhaust warm air from the mobile galley cart. A mobile galley cart system including a cart configured to dock at a separate service wall to provide service connections therebetween.

14 Claims, 15 Drawing Sheets

(51) Int. Cl.
| | |
|---|---|
| *F25B 21/04* | (2006.01) |
| *B62B 3/00* | (2006.01) |
| *B64D 11/04* | (2006.01) |
| *B60H 1/32* | (2006.01) |
| *B64D 11/00* | (2006.01) |
| *B60P 7/10* | (2006.01) |
| *B62B 5/04* | (2006.01) |
| *H05B 6/12* | (2006.01) |
| *A47J 39/00* | (2006.01) |

(52) U.S. Cl.
CPC .......... *B62B 5/0447* (2013.01); *B62B 5/0495* (2013.01); *F25B 21/04* (2013.01); *H05B 6/1209* (2013.01); *B62B 2202/67* (2013.01); *B62B 2204/02* (2013.01); *B62B 2204/04* (2013.01); *F25B 21/02* (2013.01); *F25B 2321/02* (2013.01); *F25B 2321/0251* (2013.01)

(58) Field of Classification Search
CPC ..... B62B 5/0442; B62B 5/0485; B64D 11/04; B64D 2013/0629; B64D 11/00; B64D 11/0007; B60H 1/32; E05B 73/00; F25D 11/02; F25B 21/02; F25B 21/04; B60T 7/102; B60T 7/104; B60T 11/046; B60P 7/10
See application file for complete search history.

(56) References Cited

U.S. PATENT DOCUMENTS

| | | | | |
|---|---|---|---|---|
| 3,733,836 | A | * | 5/1973 | Corini ..................... F25B 21/02 62/3.61 |
| 3,918,278 | A | * | 11/1975 | Spear ..................... A61G 12/001 70/58 |
| 4,180,125 | A | * | 12/1979 | Schulz ..................... F25D 23/12 165/48.1 |
| 4,285,391 | A | * | 8/1981 | Bourner ................ F25D 31/005 165/61 |
| 4,361,014 | A | | 11/1982 | Blain |
| 4,881,590 | A | * | 11/1989 | Meier ..................... A47J 39/006 165/48.1 |
| 5,056,194 | A | * | 10/1991 | Huber ..................... A47B 31/00 16/366 |
| 5,090,517 | A | * | 2/1992 | Doughty ................... B62B 5/04 188/19 |
| 5,465,660 | A | * | 11/1995 | Conti ..................... B30B 9/3003 100/100 |
| 5,628,241 | A | * | 5/1997 | Chavanaz ............... A47B 31/02 165/64 |
| 5,655,595 | A | * | 8/1997 | Westbrooks, Jr. .... A47J 39/006 165/48.1 |
| 5,727,654 | A | | 3/1998 | Roessner et al. |
| 5,943,876 | A | * | 8/1999 | Meyer ..................... C09K 5/066 312/401 |
| 5,950,450 | A | | 9/1999 | Meyer et al. |
| 6,344,630 | B1 | | 2/2002 | Jarvis et al. |
| 2012/0217343 | A1 | | 8/2012 | Koschberg et al. |
| 2013/0036755 | A1 | * | 2/2013 | Kang ....................... B01L 1/50 62/129 |
| 2013/0047657 | A1 | | 2/2013 | Oswald et al. |

FOREIGN PATENT DOCUMENTS

| | | |
|---|---|---|
| CN | 201137336 Y | 10/2008 |
| CN | 201270942 Y | 7/2009 |
| CN | 202608820 U | 12/2012 |
| DE | 19525878 C1 | 11/1996 |
| DE | 19733934 C1 | 7/1998 |
| DE | 102009024210 B4 | 4/2013 |
| FR | 2737638 A1 | 2/1997 |
| GB | 2095387 A | 3/1981 |
| GB | 2 095 387 A | 9/1982 |
| JP | H042302 A | 1/1992 |
| JP | H0568962 B2 | 9/1993 |
| JP | 3050213 U | 6/1998 |
| JP | 2001190338 A | 7/2001 |
| JP | 2001194051 A | 7/2001 |
| JP | 3776274 B2 | 5/2006 |
| JP | 2009082168 A | 4/2009 |
| JP | 3159284 U | 5/2010 |
| KR | 101103031 B1 | 1/2012 |

OTHER PUBLICATIONS

Office Action issued in Canadian Patent Application No. 2,922,475 dated Dec. 12, 2016.
International Preliminary Report on Patentability dated Mar. 1, 2016 for PCT/US2014/053692.

* cited by examiner

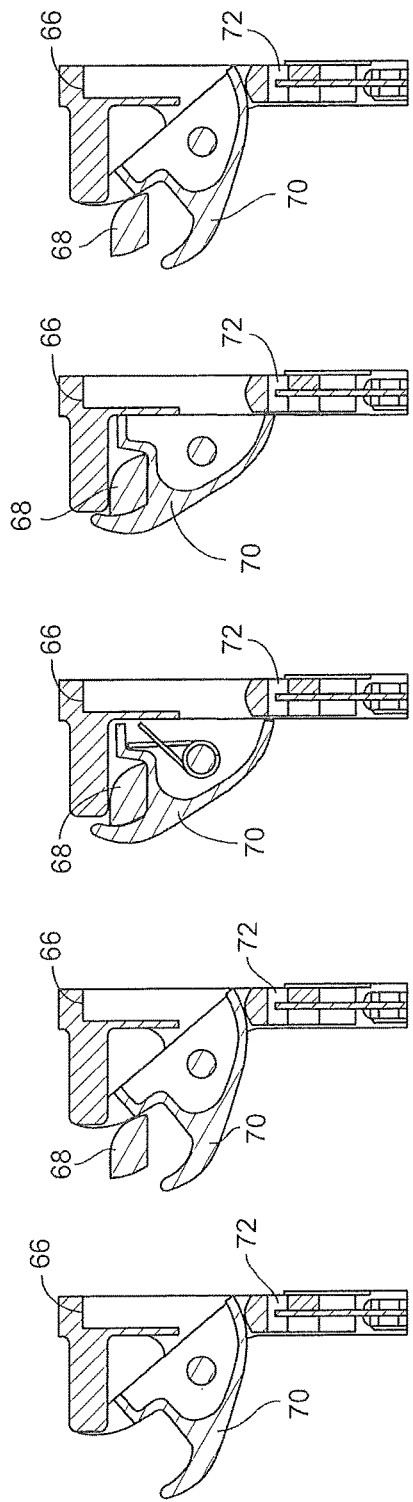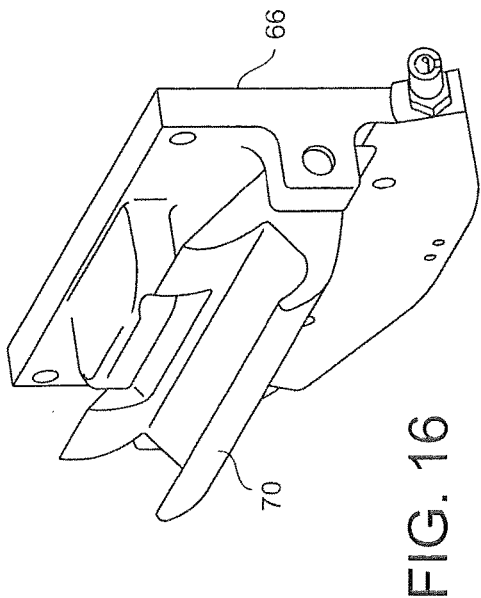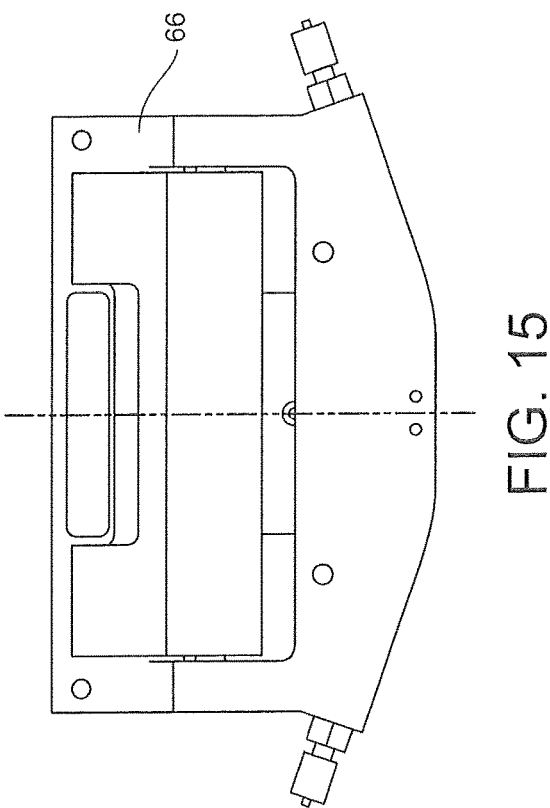
FIG. 17a  FIG. 17b  FIG. 17c  FIG. 17d  FIG. 17e
FIG. 16
FIG. 15

MOBILE GALLEY CART WITH HEATING, COOLING AND BRAKING FUNCTIONALITY

CROSS-REFERENCE TO RELATED APPLICATION

This application claims priority from U.S. application Ser. No. 61/872,216 filed Aug. 30, 2013, the entirety of which is incorporated herein by reference.

TECHNICAL FIELD AND BACKGROUND OF THE INVENTION

The present invention relates generally to a mobile food and beverage service cart of the type used on an aircraft, and more particularly, to a mobile galley cart including one or more of a self-contained chiller, induction platens for heating specific areas of corresponding meal trays, flexible connections to a galley cart service wall, handle-operated braking mechanism, service wall latching mechanism with visual confirmation, and door latches configured for greater than 180 degree opening, among other features.

Mobile galley carts are used on aircraft and other conveyances to serve food and beverages to passengers. Meals are typically prepared in advance by caterers, and may include both hot and cold portions within the same meal. In conventional galleys, food intended to be served warm or hot is typically heated in an oven located in the galley outside of the carts, then quickly served before the food has a chance to cool to an undesirable temperature. Food that requires cooling may be refrigerated within or outside of the galley cart. Since no galley cart currently exists that can both heat and cool food in separate areas of the same tray when the trays are loaded into the cart, and because a chilled galley cart tends to cool heated food rapidly, food service must be done quickly, is laborious to prepare, and requires separate appliances for heating and cooling.

Braking mechanisms for galley carts are traditionally operated via independently-operated foot brakes located at both ends of the cart, typically with a first pedal for applying the brake and a second pedal for releasing the brake. This type of braking system is cumbersome to operate and requires the attendant to continuously look down to visually locate the pedals. Since the cart requires the use of the attendant's hands to push and manipulate the cart, it would be desirable to collocate the brakes with the handle, thus simplifying the cart and obviating the need for foot pedals.

Conventional galley carts further employ inflexible utility connections that require precise alignment. Inflexible utility connections are not able to compensate for movement from floor deflection during turbulence, takeoff and landing, which can result in damage to the cart, the separate service wall and the connections therebetween. Conventional galley carts further employ inadequate latching mechanisms for securing the carts at the service wall, which leads to cumbersome operation and unintentional rolling that can be both destructive and dangerous.

Therefore, what is needed is a galley cart that overcomes the disadvantages of conventional carts, as well as a universal galley cart system configured to achieve full-service food preparation.

BRIEF SUMMARY OF THE INVENTION

It is an object of the invention to provide a mobile galley cart configured for use on an aircraft or other conveyance.

It is a further object of the invention to provide a mobile galley cart configured to serve both hot and cold meals from the same cart and/or heat and cool separate compartments of the same meal tray.

It is a further object of the invention to isolate hot and cold air flow within the cart.

It is a further object of the invention to collocate the cart brake engagement and release lever with the cart handles.

It is a further object of the invention to provide a galley cart system including a mobile galley cart and separate service wall, wherein the cart is configured to dock at the service wall between uses, latch to the wall to prevent unintentional separation, and connect to services provided by the wall, such as electrical, data, water, air circulation, air extraction, and waste water services, among other.

To achieve the foregoing and other objects, in a first embodiment the present invention provides a mobile galley cart including a wheeled insulated housing formed from opposing sidewalls, end walls, a top and a bottom, with one of the opposing end walls being a door configured to open to access the interior of the housing, a thermoelectric chiller mounted near the bottom of the cart, cold air ducting in at least one of the sidewalls, end walls and bottom in fluid communication with the thermoelectric chiller, the cold air ducting opening to the interior of the mobile galley cart through a plurality of openings through at least one of the sidewalls and end walls, and warm air ducting including a warm air exhaust arranged to exhaust warm air from the mobile galley cart.

In another aspect, the warm air ducting may be arranged below the thermoelectric chiller.

In a further aspect, the galley cart may include induction coils arranged to form platens subdividing the interior of the galley cart, the induction coils for heating ferric portions of meal trays stored on top of the platens within the interior of the mobile galley cart.

In a further aspect, the galley cart may include a temperature feedback loop or microchip temperature sensor and controller for powering the induction coils.

In a further aspect, the platens may be supported by the sidewalls and subdivide the interior of the galley cart into a plurality of meal tray compartments.

In a further aspect, the galley cart may include wheel brakes actuated by handles located at both ends of the mobile galley cart, each of the handles operating independently of the other to allow the wheel brakes to be disengaged from either end of the cart.

In a further aspect, the handles may be interconnected to the wheel brakes through cabling, and may rotate downward to pull the cabling to disengage the wheel brakes and rotate upward to release tension on the cabling and engage the brakes.

In a further aspect, the door may be hinged to the insulated housing through 270 degrees by way of double throw rotating block hinges embedded into an edge of one of the side walls, the door pivoting through 180 degrees with respect to a rotating block that in turn pivots through 90 degrees with respect to the side wall.

In a further aspect, at least one of the sidewalls, end walls, top and bottom may be constructed from foam and honeycomb phenolic panels and vacuum insulation panels.

In a further aspect, the plurality of openings through at least one of the sidewalls and end walls may increase in diameter in the direction from the bottom to the top of the mobile galley cart.

In a further aspect, the galley cart may include an upper bar that forms part of a wheel brake release handle a lower bar positioned near the bottom of the mobile galley cart, the upper bar arranged to engage a spring loaded pawl of a latching mechanism located on a separate service wall to latch the mobile galley cart to the separate service wall between uses.

In a further aspect, the galley cart may include receivers for receiving service connections from a separate service wall, the service connections including one or more of electrical, data, water, air circulation, air extraction, and waste water services.

In another embodiment, the present invention provides a mobile galley cart system including a service wall having at least one service connection, a mobile galley cart configured to dock at the service wall, and a latching mechanism for retaining the mobile galley cart to the service wall between uses, the latching mechanism including latches on the service wall that positively engage the mobile galley cart, wherein service connections between the service wall and the mobile galley cart are flexible to accommodate relative movement between the service wall and the mobile galley cart.

In another aspect, the mobile galley cart may include an upper bar that forms part of a wheel brake release handle a lower bar positioned near the bottom of the mobile galley cart, the upper and lower bars of the galley cart engaging the latches on the service wall to retain the mobile galley cart to the service wall between uses.

In a further aspect, an upper latch on the service wall may include a rotatable spring-loaded pawl arranged to rotate to capture the upper bar of the mobile galley cart upon engagement with the pawl.

In a further aspect, the latching mechanism may include a visual latch engagement indicator and button configured to be actuated to rotate the pawl to release the captured upper bar.

In a further aspect, the at least one service connection may include electrical, data, water, air circulation, air extraction, and waste water services.

In a further aspect, the mobile galley cart may include an air circulation system and the service wall may include an air extraction system including a warm air return for extracting warm air from the mobile galley cart.

In a further aspect, the mobile galley cart may include one or more induction platens for heating ferric portions of meal trays stored within the mobile galley cart.

In a further aspect, the mobile galley cart may include wheel brakes actuated by handles located at both ends of the mobile galley cart, each of the handles operating independently of the other to allow the wheel brakes to be disengaged from either end of the cart, wherein the handles are interconnected to the wheel brakes through cabling and rotate downward to pull the cabling to disengage the wheel brakes and rotate upward to release tension on the cabling and engage the brakes.

Embodiments of the invention can include one or more or any combination of the above features, aspects and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 15 illustrates a galley cart service wall latch;

FIG. 16 is an isometric view of a galley cart handle;

FIGS. 17a-e are sequential views of service wall latch operation;

DETAILED DESCRIPTION OF THE INVENTION

Figure 2:
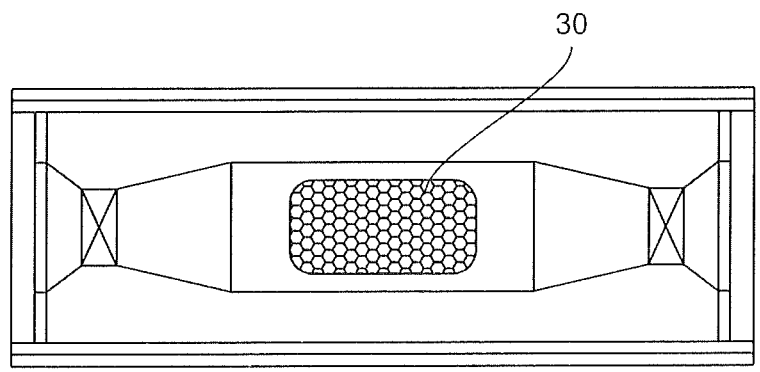
FIG. 2 is a top view into the interior of the galley cart.
Figure 1:
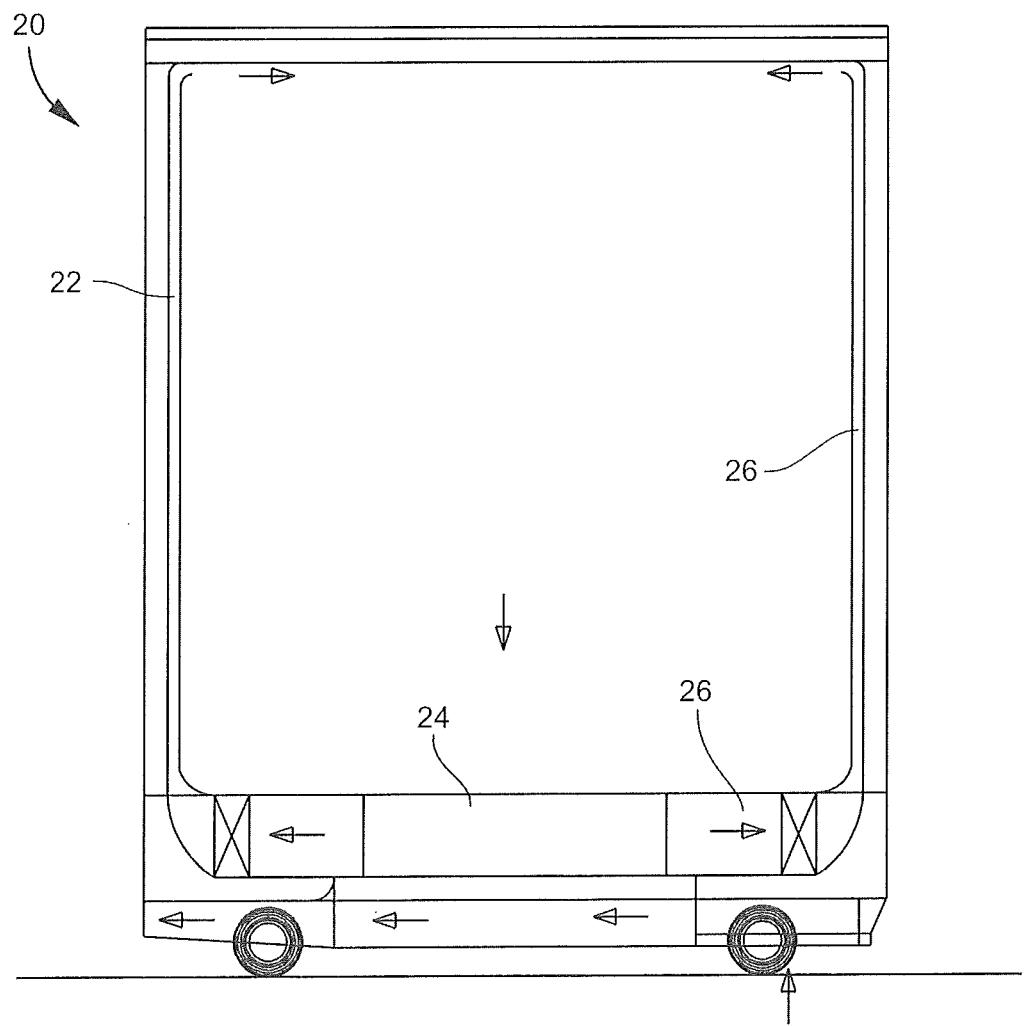
FIG. 1 is a sectional view through the width of a galley cart according to an embodiment of the invention.
Figure 4:
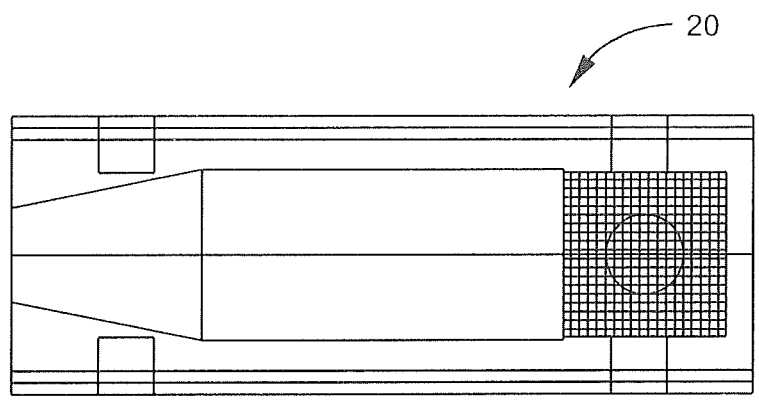
FIG. 4 is a bottom view of the galley cart.
Figure 3:
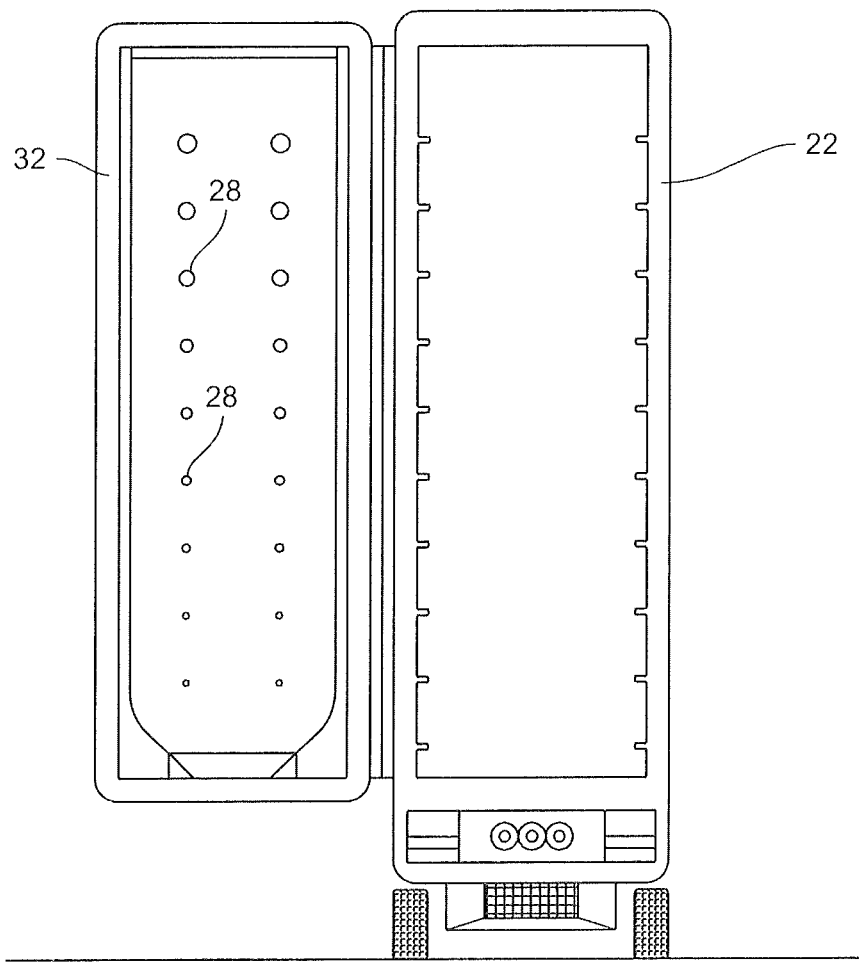
FIG. 3 is an end view of the galley cart shown with the door open.
Figure 6:
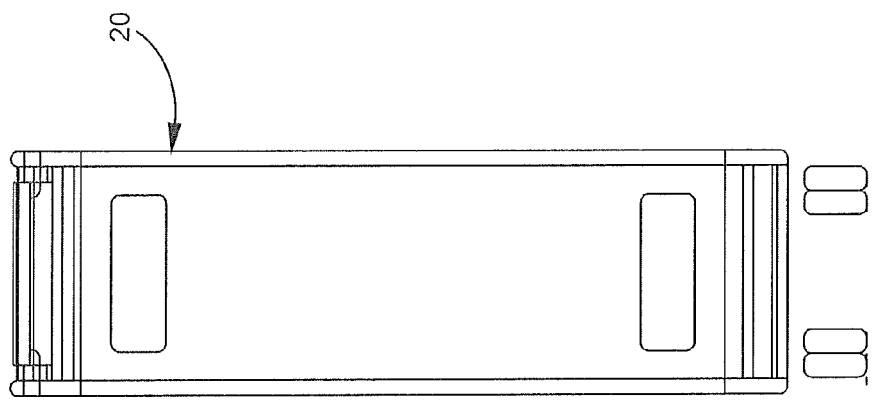
FIG. 6 is an end view of the galley cart showing service wall connections.
Figure 5:
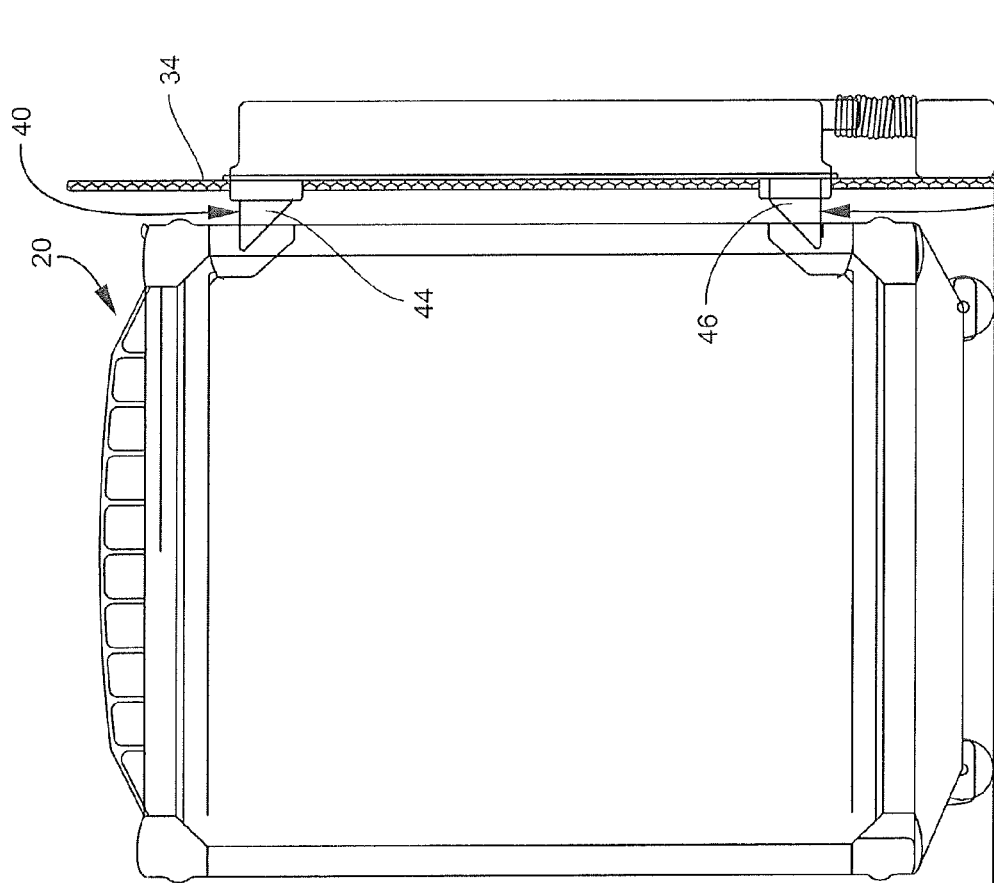
FIG. 5 is a side elevation view showing the galley cart docked at a separate service wall.
Figure 9:
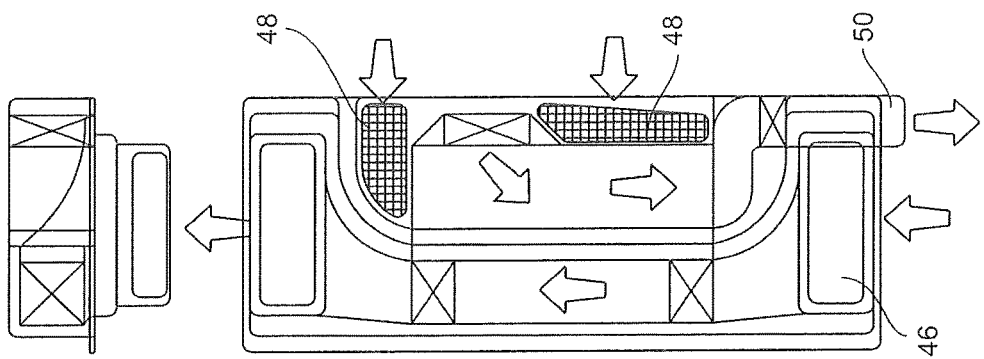
FIG. 9 illustrates air circulation within the galley cart and between the galley cart and the service wall.
Figure 8:
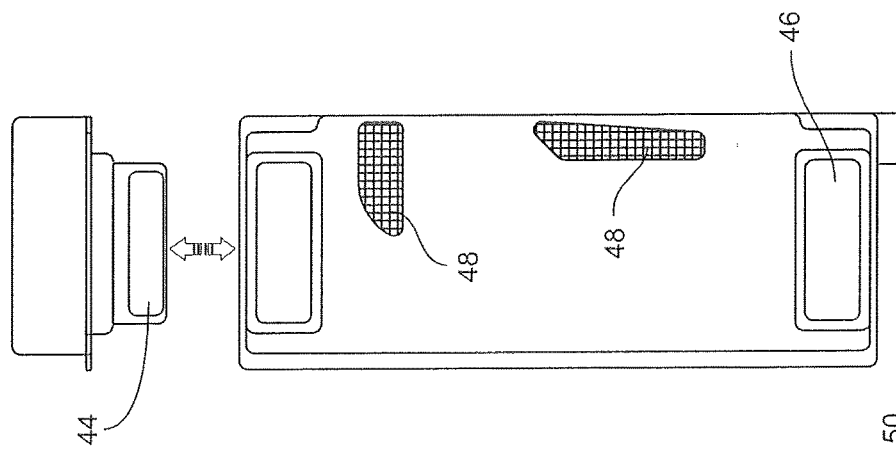
FIG. 8 illustrates air exchange between the service wall and the galley cart.
Figure 7:
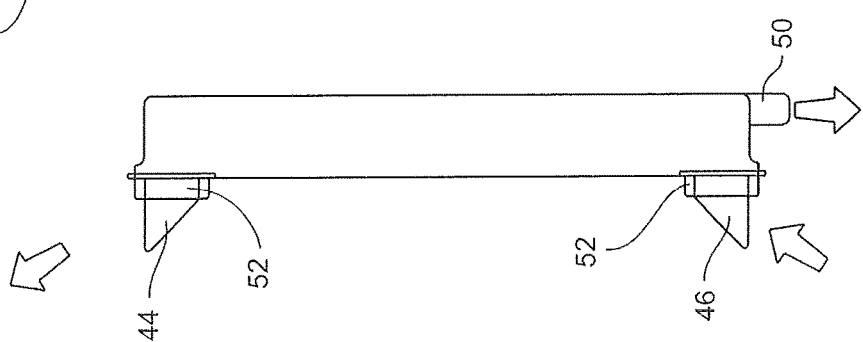
FIG. 7 illustrates service wall air returns.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to FIGS. 1-4, a mobile galley cart according to an embodiment of the invention is shown generally at reference numeral 20. The galley cart 20 includes a wheeled, insulated housing 22 formed from a pair of opposing sidewalls, a pair of opposing end walls, a top and a bottom. One or more of the opposing end walls is a door 32 configured to open and close to provide access to the interior of the cart 20. The walls, doors, top and bottom are preferably insulated so as to maintain a predetermined temperature within the interior of the cart and help prevent any thermal loss and gain from the outside environment.

Any of the walls, doors, top and bottom of the cart 20 may be made from composite construction to provide both thermal and structural integrity. In a specific embodiment, the composite construction is a sandwich panel construction incorporating foam and honeycomb phenolic panels and vacuum insulation panels.

A thermoelectric chiller, shown schematically at reference numeral 24, based for example on the principles of the Peltier cycle, is mounted near the bottom of the cart 20, with the heat generated therefrom being extracted or exhausted through a separate service wall by way of a warm air exhaust and associated warm air ducting. The cooled air inside the cart 20 as a result of the electrical operation of the chiller is distributed inside the cart via cold air ducting 26 in the floor and doors. The cooled air is directed through the ducts 26 along the bottom of the cart, upward through the doors, and exits through openings 28 or "jet holes" of varying diameters. As shown, the openings 28 increase in diameter from the bottom to the top of the cart. The diameters can be customized to provide the same or different levels of cooling to each individual layer of meal trays. The ducts 26 may be integral within the inner walls or doors. The services for the chiller 24 are supplied via connections (see FIG. 13) to the service wall at the back of the cart bay or in another location. The chiller 24 is preferably mounted near the bottom or at the bottom of the cart 20 to maintain a low center of gravity, facilitate easy and rapid installation/removal, enable simple and effective connection to an exhaust air or extraction system, and isolate the hot and cold sides from each other's air flow. The flow of air is of re-circulatory nature, with FIG. 2 illustrating an air return grill 30. Forced and filtered hot air is ducted beneath the chiller 24 to the exhaust air or extraction system.

In addition to the chilled cart 20 described above, the same technological principles of thermoelectric chilling can be used as a 'Point of Use' (POU) system. Using the "air through" system of chilling a cart, the POU system is mounted on the galley or other structure outside of the cart where the air is distributed in a similar mode as the self-contained cart with the flow being optimized within internal air distribution ducting for this purpose.

Figure 13:
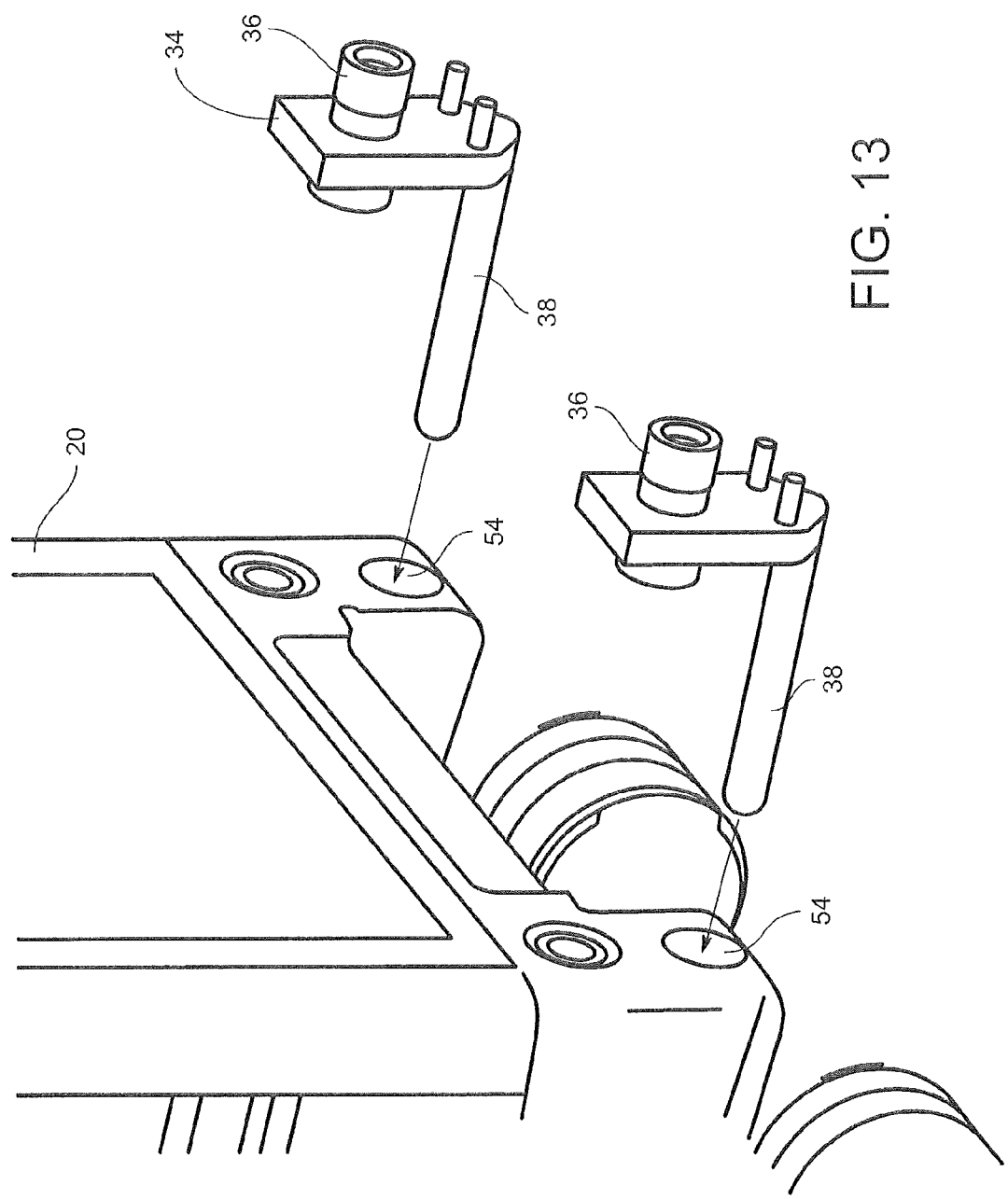
FIG. 13 is a detailed view of the service connections between the galley cart and the service wall.

Referring to FIGS. 5-9, the galley cart 20 is configured to dock at a separate service wall 34 located at the galley or other location. Service connections between the galley cart 20 and service wall 34 can include, but are not limited to, one or more of electrical, data, water, air circulation, air extraction, and waste water services. Connectors may be provided on either end or both ends of the cart 20. Examples of service connectors mounted on the service wall 34 and the galley cart 20 are shown in FIG. 13. The service wall connectors 36 may include spigots 38 mounted on the wall. Receivers 54 on the cart may be coned to facilitate alignment of the cart 20 during latch engagement. The flexibility in the connections between the cart 20 and service wall 34 facilitates alignment and permits relative movement between the service wall and cart while engaged to prevent damage from floor deflection during turbulence, takeoff and landing. The cart latching mechanism, which is discussed below and further illustrated in FIGS. 15-18, may be mounted on an articulating wall mounting or interface to further facilitate relative movement between the cart 20 and the separate service wall 34.

Referring to FIGS. 5-9, the air circulation system of the cart 20 engages with the air circulation system of the service wall 34 by way of spaced upper and lower connections 40, 42. The upper connection 40 includes a cold air feed 44 in the case of a POU chiller, and the lower connection 42 includes a warm air return 46 for extracting/exhausting warm air from the cart. When the cart 20 is engaged with the service wall 34, the cold air feed 44 and the warm air return 46 are in fluid communication with the respective cold air ductwork and warm air ductwork of the cart, thereby allowing hot air to flow from the cart, and chilled air to flow into the cart in the case of a POU chiller. With the cart 20 engaged, warm air from the cart is extracted through the warm air return 46 and warm air intakes 48 of the service wall 34 that align with the respective warm air exhaust and hot side of the cart. Warm air is directed through the service wall 34 and exhausted elsewhere through exhaust 50. Seals, such as sponge seals 52 or like seals, may be provided at the cold air feed 44 and warm air return 46 to help prevent air loss during air transfer. In the case of a POU chiller located at the service wall, cold air generated at the galley chiller is directed to the cart through the cold air feed 44.

Figure 11:
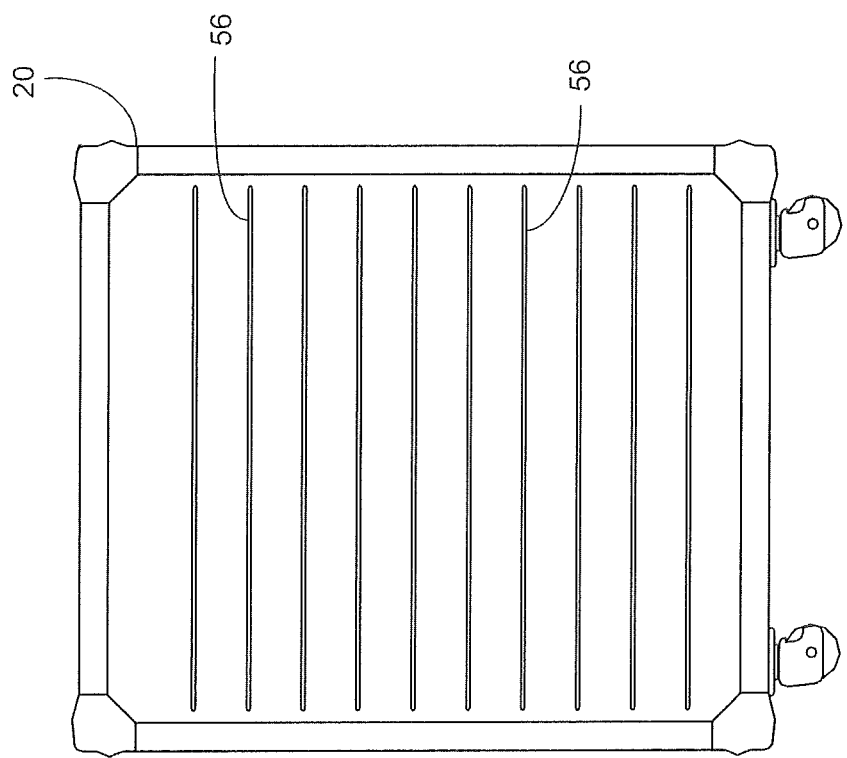
FIG. 11 is a side view of the cart illustrating platen compartmentalization of the interior.
Figure 10:
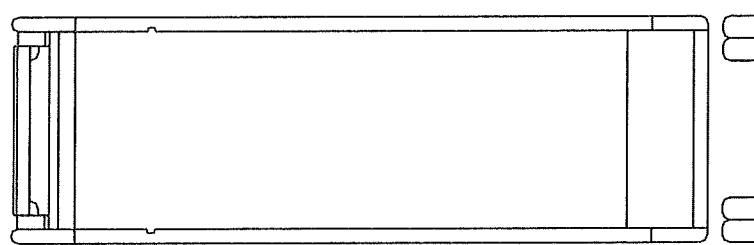
FIG. 10 is an end view of the galley cart illustrating a handle.
Figure 12:
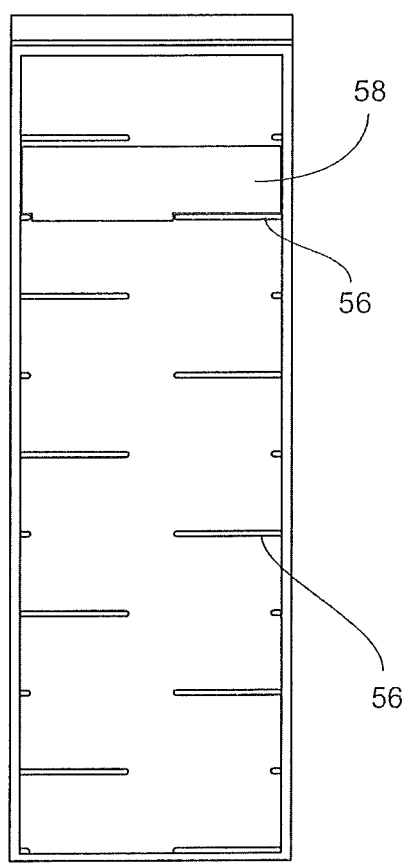
FIG. 12 is a side view of the cart with the door removed to illustrate a specific platen arrangement.

Referring to FIGS. 10-12, the galley cart 20 may include induction platens 56 for heating specific ferric portions of a meal tray within the cart. The cart 20 may be chilled, or not, and the induction system can be operated with or without a chiller or a POU system. Thus, the cart 20 can be configured to chill, heat or a combination of both.

The interior of the galley cart 20 may be subdivided into a plurality of planes by the induction platens 56 that may be formed integrally with the housing or supported by the housing walls. Induction coils for generating the eddy currents are positioned along the length of the cart on one side or on alternative sides (see FIG. 12) in the form of the induction platens with local ferric, aluminum or other electrically-conductive heat 'receivers' within the meal trays 58. The exposure of the receivers to the electromagnetic field enables localized heating within the trays, with the rest of the system remaining chilled or unaffected by the locally heated area(s).

Services for the induction heating may be provided through the connection with the service wall 34. The generator may be fed by a power line from the service wall 34, or from a battery within the cart 20. The electrical connection to each individual platen 56 may be contained within the mounting wall(s) itself. The cart 20 can be either singularly loaded with the trays 58 or can be pre-loaded in a bulk carrier that is loaded into the cart, locating the receivers in the necessary operational position relative to the induction coils. Control of the EMI emissions generated by the operation of the inductive heating coils may be achieved by the use of a form of Faraday cage built into the wall structure of the cart itself.

Cooking cycles may be pre-programmed or controlled by a temperature feedback loop or microchip temperature sensor. Through programming or other feedback loop, a switching mechanism (e.g., programmable distribution bus) can be situated between the power supply (e.g., power line or battery) and the individually wired induction coils to pulse between different induction coils to minimize power consumption, yet achieve local heating of the receivers and hence the food or beverage in the area of or overlying the receivers.

Figure 14:
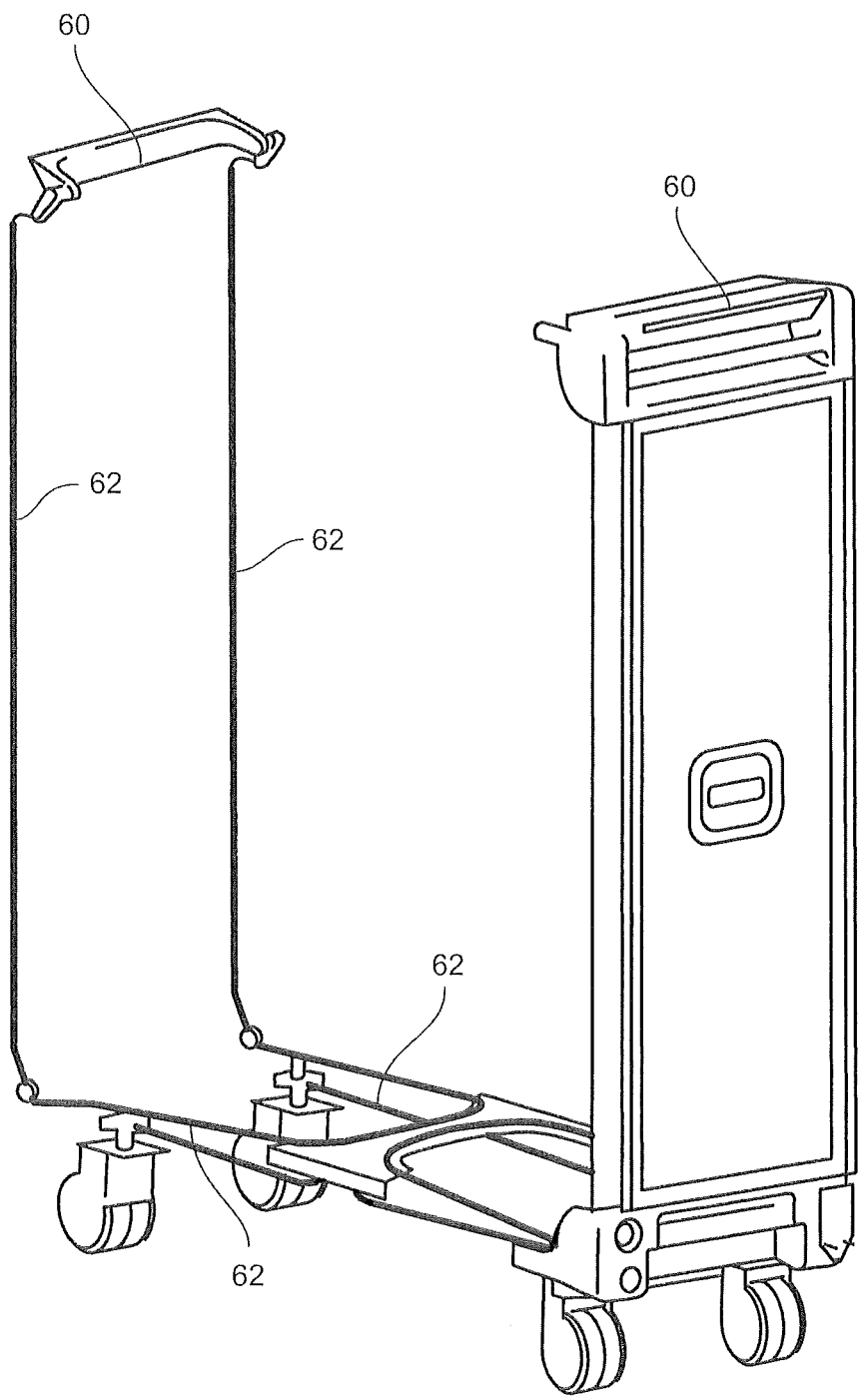
FIG. 14 is an isolated view of the handle and braking mechanism arrangement of the galley cart.
Figure 19:
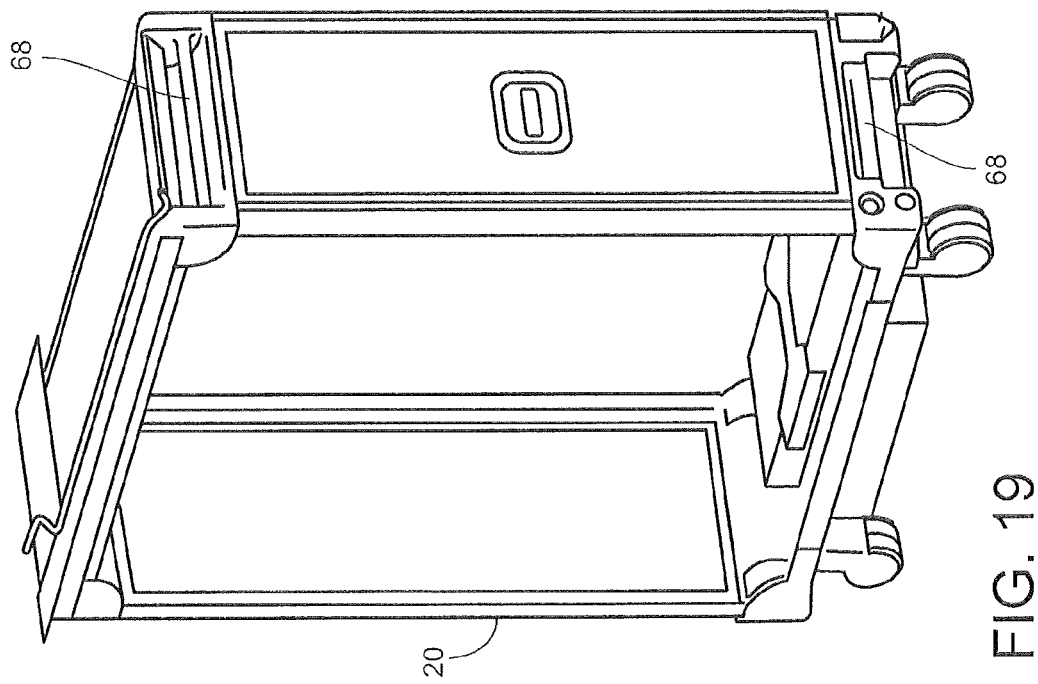
FIG. 19 illustrates galley cart latching bars.
Figure 18:
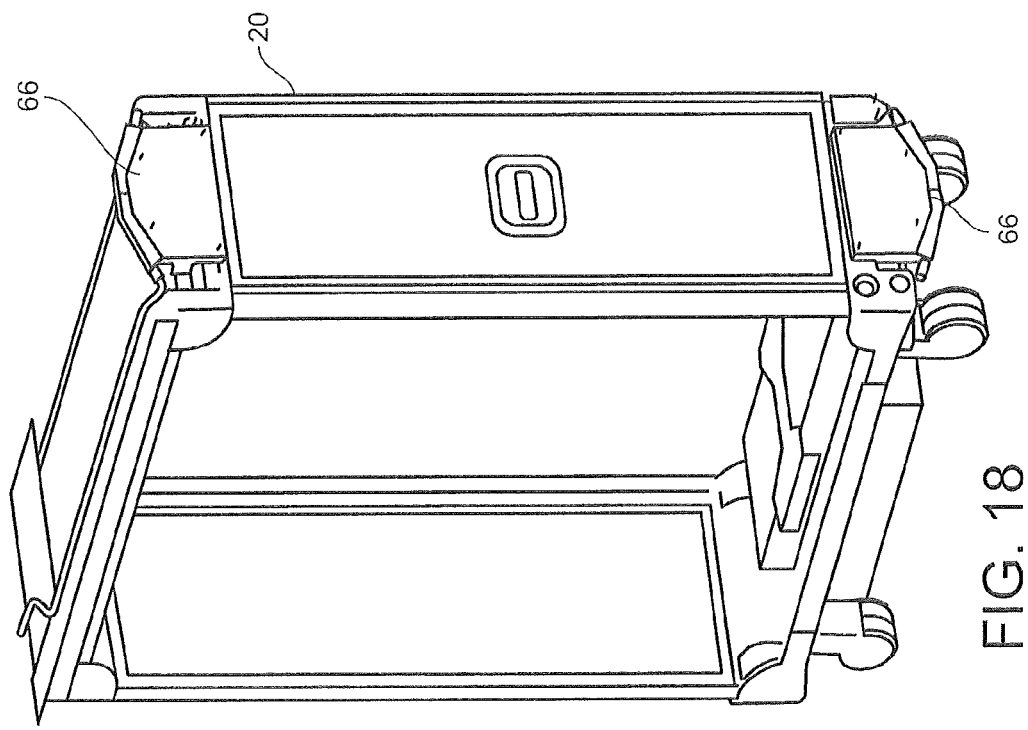
FIG. 18 illustrates service wall latching.

Referring to FIG. 14, the wheel brake mechanism according to an embodiment of the invention remains in a braked configuration when no one is pushing or pulling on the cart (i.e., reverts to a safety mode when stationary). The brakes are released by actuating a handle at either end of the cart. Each handle operates independently of the other, allowing the brakes to be disengaged from either end of the cart without operating the other mechanism.

Brake handles 60 are located at both ends of the cart for accessibility, ease of use and pushing/pulling the cart. The handles 60 are rotated downward when pressure is applied to push the cart forward or pull the cart. Cabling 62, which runs along the sides and bottom of the cart and which is guided through a plurality of pulleys, operably connects the handles to the brake mechanism. As a handle rotates downward, the cabling is pulled in the direction of the handle, thereby releasing the brakes from engagement with the wheels. Releasing the handle causes the handle to rotate upward, releasing the tension on the cabling and engaging the brakes. The cart may include a brake on one or more of the wheels, and each handle disengages every brake.

Referring to FIGS. 15-19, the galley cart and service wall system may further be configured with a latching mechanism for retaining the docked carts between uses. The latching system includes latches 66 on the service wall that positively engage bars 68 that form part of the brake release handles 60 in the case of an upper latch, and an independent bar near the bottom of the cart in the case of a lower latch. Providing two spaced latches (i.e., a primary latch and a secondary latch) prevents "kick up" of the cart.

Referring to FIGS. 17*a-e*, the latching mechanism automatically engages when the cart bars 68 are pushed into their respective latch, and is released remotely using mechanical activation. A back-up emergency release/engagement system can also be incorporated. When empty, a spring loaded pawl 70 of the latch is tiled downward at an oblique angle to vertical, presenting the pawl for receiving one of the bars 68 of the cart 20 (see FIGS. 16 and 17*a*). When the bar 68 contacts the pawl 70, the bar pushes downward on the pawl causing it to rotate (see FIG. 17*b*). Rotation of the pawl 70 a sufficient degree allows a spring loaded block 72 to rise vertically from beneath the pawl, thereby preventing the pawl from rotating back to the unlatched position (see FIG. 17*c*). To release the cart from the latch, the block 72 is pulled downward allowing the pawl to rotate back toward the unlatched position (see. FIG. 17*d*). The pawl is then able to rotate back to the unlatched position, allowing the captured bar 68 to be pulled away from the latch.

Figure 21A:
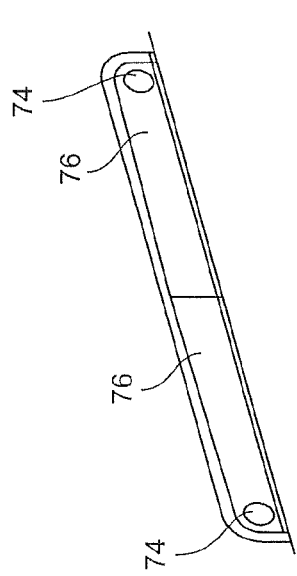
FIGS. 21a-c are sequential views illustrating the operation of a visual latching indicator.
Figure 20:
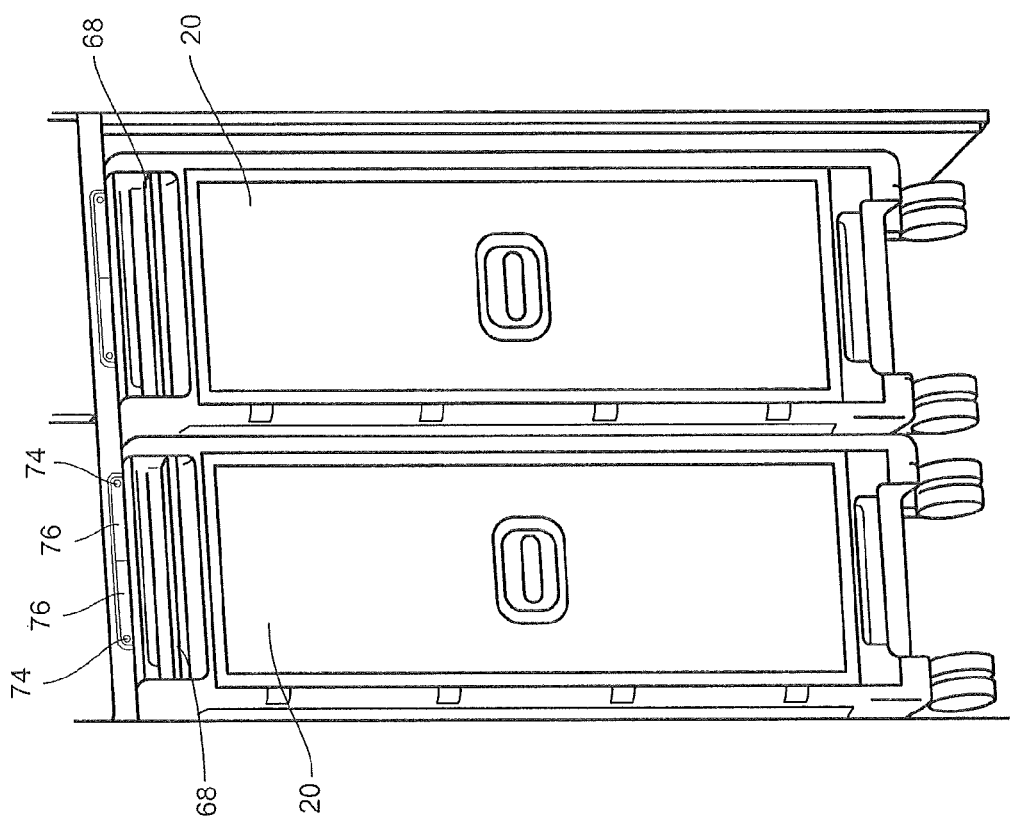
FIG. 20 shows two galley carts docked side-by-side at a service wall.

The system provides an indication of latch engagement by way of visual confirmation. Referring to FIGS. 20 and 21, positive latch engagement may be indicated by visual markers and/or the position of the latch release handles themselves. An audible warning buzzer may also be incorporated into the mechanism. FIG. 20 shows two galley carts 20 latched to a service wall in a side-by-side arrangement. The latch release mechanism may include latch buttons located above the carts for indicating "latched" and "unlatched" states of the upper and lower latches. In a further embodiment, the buttons function to lower the spring loaded blocks of their respective latch, thereby allowing the pawl 70 to rotate to release its captured bar 68. Unlatching a galley cart from the service wall may require simultaneously depressing the release buttons and pulling the cart 20 horizontally away from the wall in one specific embodiment.

Figure 21B:
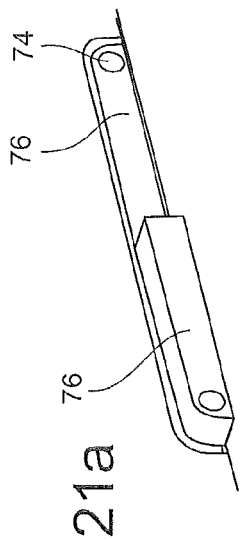
Figure 21C:
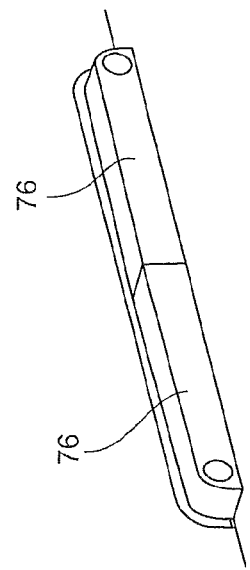

The release buttons may include a 'green button' 74 and a 'red button' 76, wherein the green button is exposed and the red button concealed when the cart is latched (see FIG. 21*a*), and the red button exposed and the green button concealed (i.e., hiding) when the cart is un-latched (see FIG. 21*c*). FIG. 21*b* shows one of the upper and lower latches latched, and the other of the latches un-latched. In other words, the mechanism shown identifies whether a mechanical latch is engaged or not, by either showing the green button, or when the bar is released, showing external portions of the latch release handle that are colored red, indicating an incorrect location of the latch. The release mechanism may include an electric push button release for a solenoid actuated latch and a red/green voltage controlled LED display may be used.

Figure 22C:
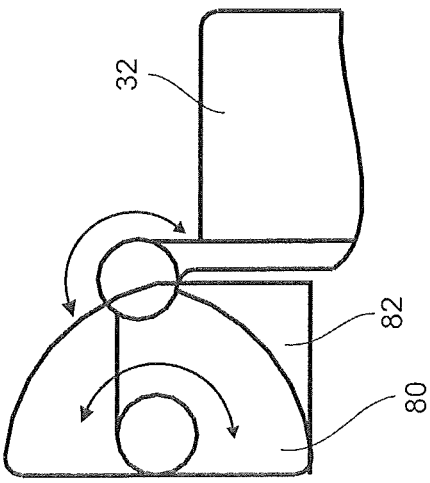
FIGS. 22a-c are sequential views of galley cart door hinge operation.
Figure 22B:
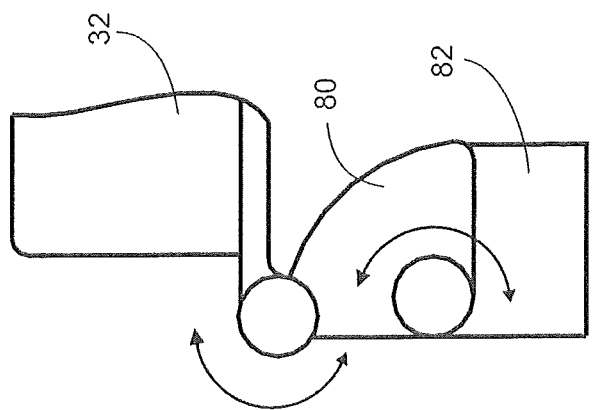
Figure 22A:
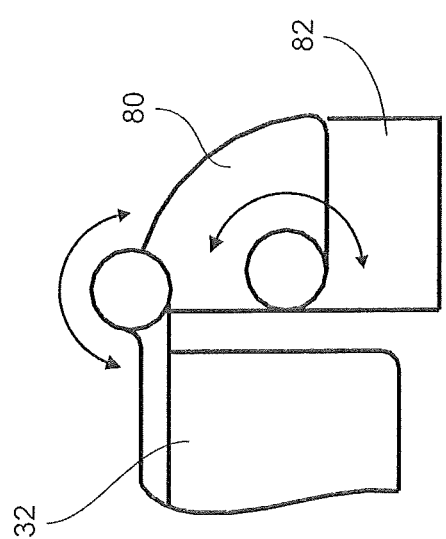

The cart door may have a double paddle latch with a three pin locking capability (top, bottom and side) for additional security. Referring to FIGS. 22*a*-22*c*, the cart door 32 may be hinged to the housing 22 through 270 degrees by way of double throw rotating block hinges embedded into the edge member forming the side wall of the cart. The door 32 pivots through 180 degrees with respect to a rotating block 80, which in turn pivots through 90 degrees with respect to the fixed side wall 82, thus providing about 270 degrees of pivoting movement of the door.

Figure 23A:
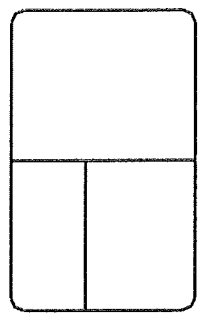
FIGS. 23a-c illustrate various meal tray configurations.
Figure 23B:
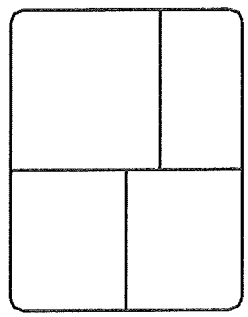
Figure 23C:
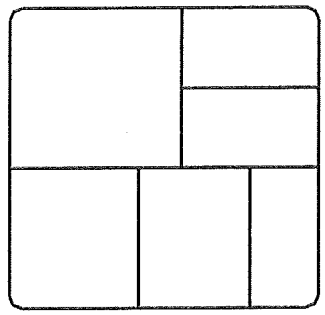
Figure 24:
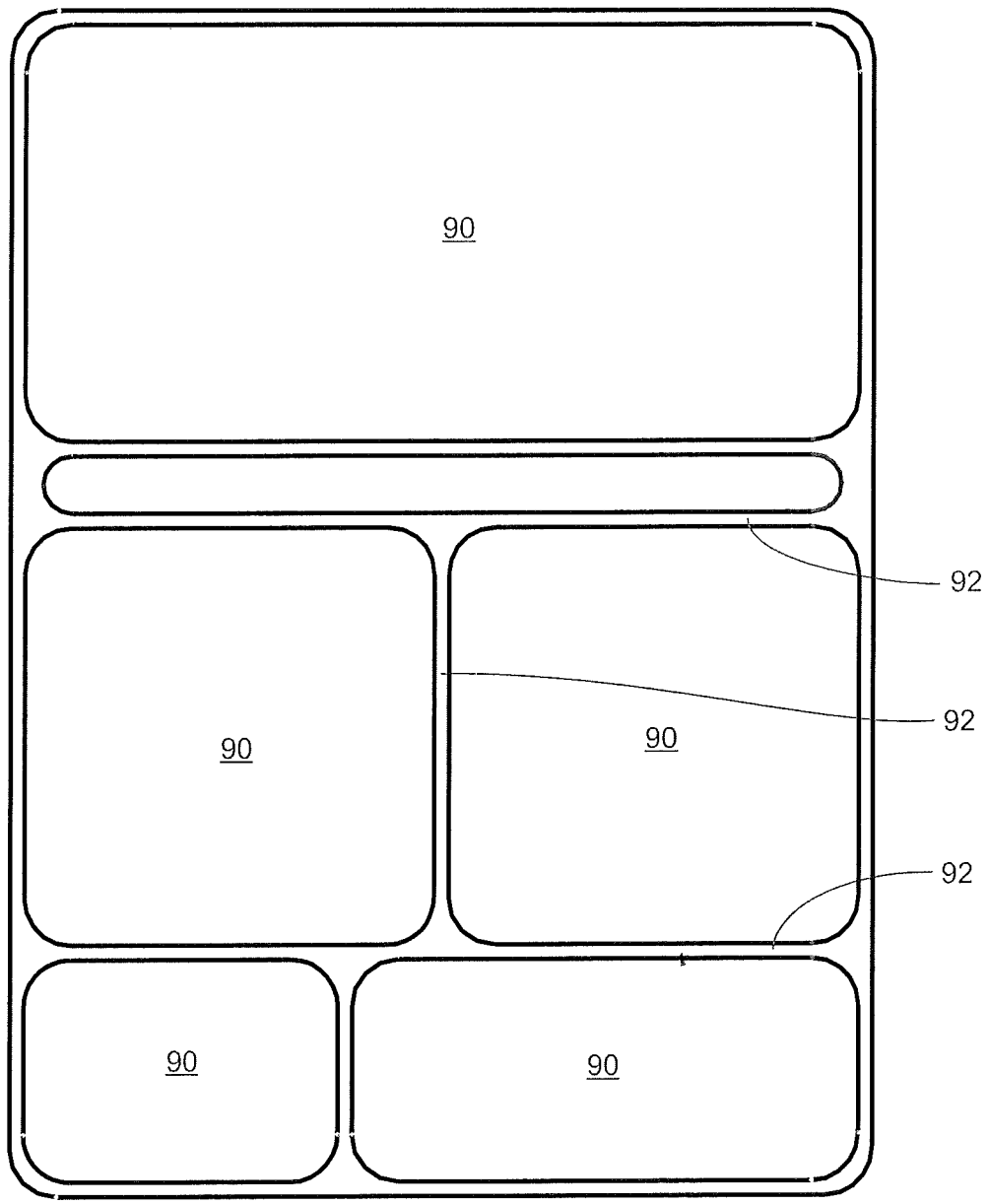
FIG. 24 shows a meal tray configuration.
Figure 25:
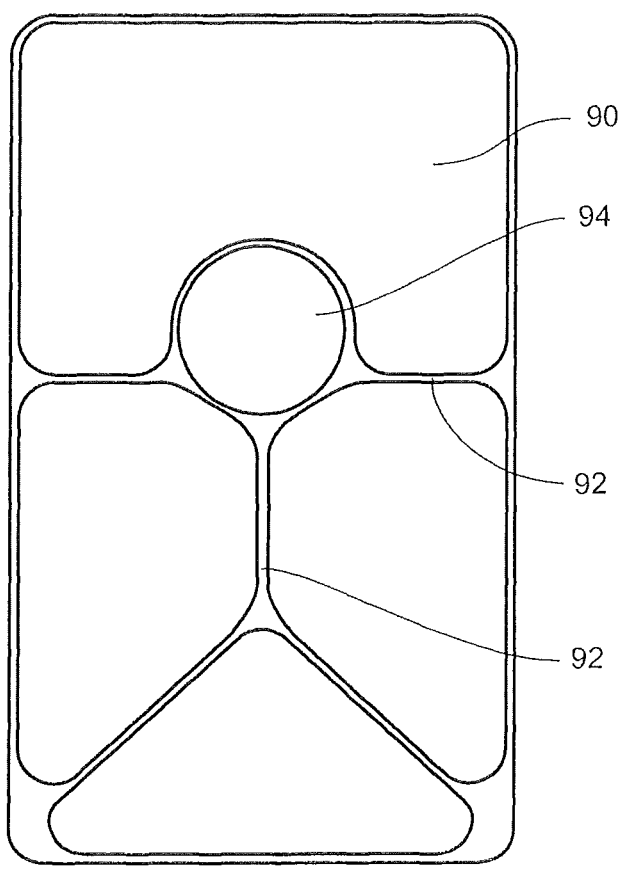
FIG. 25 shows a meal tray configuration including a heated beverage area.

Meals trays of various sizes and configurations suitable for use with the present invention that may or may not be coated in specific areas with electrically-conductive metals are shown in FIGS. 23-25. Examples of small, medium and large tray configurations are shown in FIGS. 23*a*, 23*b* and 23*c*, respectively. FIG. 24 shows an exemplary large meal tray with a plurality of separate depressions 90 for holding food and dividing ridges 92. FIG. 25 shows a meal tray with a center heated drink section 94 that may be coated with an electrically-conductive coating.

One or more of the foregoing features may be incorporated into a galley cart system, thereby providing a set of components used to generate a family of derivatives that are interchangeable from the point of view of stowage in a galley, operational usage and overall appearance. Incorporating one or more of the above features, the galley cart may be fitted with a chiller, chilled compartment, induction oven, combined chiller/oven, trash compactor, bulk drink maker, dispenser, etc.

The foregoing description provides embodiments of the invention by way of example only. It is envisioned that other embodiments may perform similar functions and/or achieve similar results. Any and all such equivalent embodiments and examples are within the scope of the present invention.

What is claimed is:
1. An aircraft galley cart, comprising:
a housing comprising a bottom, a top, two side walls, a first end wall, and a second end wall;
a first handle assembly mounted to an upper end of the first end wall;
a second handle assembly mounted to an upper end of the second end wall, wherein each of the first handle assembly and the second handle assembly includes an articulating member that moves between a first position when the handle assembly is grasped by a user and a second position when the handle assembly is not being grasped by the user;
at least four wheels, wherein each wheel of the at least four wheels is mounted proximate to a respective corner of four corners of the bottom of the housing;

at least one braking assembly configured to selectively engage or disengage a wheel brake on one or more of the at least four wheels; and a cabling assembly connecting each of the first handle assembly and the second handle assembly to the at least one braking assembly, wherein the cabling assembly is configured to disengage the at least one braking assembly upon actuation of the articulating member of either of the first handle and the second handle to the first position, and to engage the at least one braking assembly upon actuation of the articulating member of both the first handle assembly and the second handle assembly to the second position, wherein the cabling assembly comprises:

a first cable routed from one end of the first handle assembly, down a first side of the first end wall, along the bottom of the housing and communicatively connecting to the at least one braking assembly, and up a second side of the first end wall to a second end of the first handle assembly; and a second cable routed from one end of the second handle assembly, down a first side of the second end wall, along the bottom of the housing and communicatively connecting to the at least one braking assembly, and up a second side of the second end wall to a second end of the second handle assembly;

wherein the at least one braking assembly is configured for independent actuation by the first handle assembly and the second handle assembly, wherein the at least one braking assembly engages the wheel brake on the one or more of the at least four wheels when the respective articulating member of both the first handle assembly and the second handle assembly are simultaneously in the second position, and the at least one braking assembly disengages the wheel brake on the one or more of the at least four wheels when the respective articulating member of either the first handle assembly or the second handle assembly is in the first position.

2. The aircraft galley cart of claim 1, wherein the cabling assembly comprises a plurality of pulleys each configured to apply tension to a respective cable upon actuation of the articulating member of both the first handle assembly and the second handle assembly to the second position.

3. The aircraft galley cart of claim 1, wherein the first end wall comprises a first door and the second end wall comprises a second door, the first cable being routed along a vertical hinge region of the first door, and the second cable being routed along a vertical hinge region of the second door.

4. The aircraft galley cart of claim 3, wherein each of the first door and the second door is connected to one of the two side walls via a respective double throw rotating block hinge assembly.

5. The aircraft galley cart of claim 1, wherein the first handle assembly comprises a bar extending across a width of the first end wall of the housing.

6. The aircraft galley cart of claim 1, wherein the respective articulating member of each of the first handle assembly and the second handle assembly comprises a rotatable handle, wherein the rotatable handle is rotated downward in the first position, and the rotatable handle is rotated upward in the second position.

7. The aircraft galley cart of claim 6, wherein the respective rotatable handle of each of the first handle assembly and the second handle assembly is spring biased to rotate upward upon release by the user.

8. The aircraft galley cart of claim 1, further comprising a first bar mounted to a lower end of one of the first end wall and the second end wall, wherein the first bar is configured to releasably engage a corresponding first latch mounted to a service wall of a cart bay.

9. The aircraft galley cart of claim 8, wherein at least one of the first handle assembly and the second handle assembly is configured to releasably engage a corresponding second latch mounted to an upper portion of the service wall of the cart bay.

10. A braking system for an aircraft galley cart, comprising:

a first handle assembly for mounting to a first end wall of a housing of the aircraft galley cart;

a second handle assembly for mounting to a second end wall of the housing, wherein each of the first handle assembly and the second handle assembly includes an articulating member that moves between a first position when the respective handle assembly is grasped by a user and a second position when the respective handle assembly is not being grasped by the user;

at least one braking assembly configured, upon installation, to selectively engage or disengage wheel brakes on one or more of a plurality of wheels of the aircraft galley cart; and a translation assembly connecting each of the first handle assembly and the second handle assembly to the at least one braking assembly, wherein the translation assembly and the at least one braking assembly are configured to cooperate to disengage the wheel brakes on the one or more of the plurality of wheels upon movement of the articulating member of one of the first handle assembly and the second handle assembly into the first position, and to engage the wheel brakes on the one or more of the plurality of wheels upon the articulating member of both of the first handle assembly and the second handle assembly being simultaneously in the second position, wherein the translation assembly comprises:

a first cable routed, upon installation, from one end of the first handle assembly, down a first side of the first end wall, along the bottom of the housing and communicatively connecting to the at least one braking assembly, and up a second side of the first end wall to a second end of the first handle assembly; and a second cable routed, upon installation, from one end of the second handle assembly, down a first side of the second end wall, along the bottom of the housing and communicatively connecting to the at least one braking assembly, and up a second side of the second end wall to a second end of the second handle assembly.

11. The braking system of claim 10, wherein the translation assembly comprises a plurality of cables.

12. The braking system of claim 11, wherein the translation assembly comprises a plurality of pulleys each configured to apply tension to a respective cable of the plurality of cables when the respective articulating member of each of the first handle assembly and the second handle assembly is in the second position.

13. The braking system of claim 10, wherein the first handle assembly comprises a bar extending across a width of the first end wall.

14. The braking system of claim 10, wherein the respective articulating member of each of the first handle assembly and the second handle assembly comprises a rotatable handle, wherein the rotatable handle is rotated downward in the first position, and the rotatable handle is rotated upward in the second position.

* * * * *